(12) United States Patent
Wu et al.

(10) Patent No.: US 10,259,372 B2
(45) Date of Patent: Apr. 16, 2019

(54) MOBILE-TYPE POWER EQUIPMENT MAINTENANCE DEVICE

(71) Applicants: State Grid Henan Electric Power Corporation Maintenance Company, Zhengzhou, Henan (CN); State Grid Henan Electric Power Company, Zhengzhou, Henan (CN); State Grid Zhengzhou Electric Power Supply Company, Zhengzhou, Henan (CN); Henan EPRI Electric Power Technology Co., Ltd., Zhengzhou, Henan (CN)

(72) Inventors: Jiaxin Wu, Henan (CN); Guoqing Jiang, Henan (CN); Lu Li, Henan (CN); Jinguang Zhang, Henan (CN); Yingwen Li, Henan (CN); Hui Shen, Henan (CN); Dongsheng Xu, Henan (CN); Xiaohui Wang, Henan (CN); Xin Qu, Henan (CN); Li Zhang, Henan (CN); Haiyun Guo, Henan (CN); Hui Lin, Henan (CN); Tianye Niu, Henan (CN); Qi Lan, Henan (CN); Yongheng Ku, Henan (CN); Lujiang Zhang, Henan (CN); Xiaodan Wang, Henan (CN); Runge Hu, Henan (CN); Yong Lu, Henan (CN); Furong Liu, Henan (CN); Weihua Lian, Henan (CN); Yucai Zhao, Henan (CN)

(73) Assignees: STATE GRID HENAN ELECTRIC POWER CORPORATION MAINTENANCE COMPANY, Henan (CN); STATE GRID HENAN ELECTRIC POWER COMPANY, Henan (CN); STATE GRID ZHENGZHOU ELECTRIC POWER SUPPLY COMPANY, Henan (CN); HENAN EPRI ELECTRIC POWER TECHNOLOGY CO., LTD., Henan (CN)

( * ) Notice: Subject to any disclaimer, the term of this patent is extended or adjusted under 35 U.S.C. 154(b) by 25 days.

(21) Appl. No.: 15/490,408

(22) Filed: Apr. 18, 2017

(65) Prior Publication Data
US 2017/0361753 A1    Dec. 21, 2017

(30) Foreign Application Priority Data

Jun. 20, 2016    (CN) .......................... 2016 1 0435884

(51) Int. Cl.
*B60P 3/14*    (2006.01)
*B60P 1/54*    (2006.01)
(Continued)

(52) U.S. Cl.
CPC .................. *B60P 3/14* (2013.01); *B08B 3/12* (2013.01); *B08B 13/00* (2013.01); *B60P 1/54* (2013.01);
(Continued)

(58) Field of Classification Search
CPC ............ B60P 1/54; B60P 3/14; B60P 1/5409; B66C 5/02; B66C 23/00
(Continued)

(56) References Cited

U.S. PATENT DOCUMENTS

| 2006/0055193 A1* | 3/2006 | Colborne | .................. B60P 3/14 296/24.3 |
| 2010/0265068 A1* | 10/2010 | Brackmann | ............... B60P 3/03 340/572.1 |

(Continued)

FOREIGN PATENT DOCUMENTS

| CN | 101872943 A | 10/2010 |
| CN | 104727539 A | 6/2015 |

(Continued)

*Primary Examiner* — Gregory A Blankenship
(74) *Attorney, Agent, or Firm* — Rossi, Kimms & McDowell LLP

(57) ABSTRACT

A mobile-type maintenance square-shaped bin including a bin body, a travelling mechanism provided under the bin (Continued)

body, a car head connected with one end of the bin body, an inlet and an outlet provided at the other end of the bin body, a sealed door provided on the inlet and the outlet, an allocation and transportation device mutually connected with a microcomputer signal provided at a front end of the bin body as well as provided over an internal portion of the bind body, an maintenance platform provided at a bottom of the internal portion of the bin body, a tool platform provided adjacently to the maintenance platform, an ash-removal mechanism provided at an upper portion of the maintenance platform, an air-conditioning device provided at an outer portion of the bin body, and a scanning mechanism provided at a front portion of the maintenance platform.

11 Claims, 11 Drawing Sheets

(51) Int. Cl.
*B08B 3/12* (2006.01)
*B66C 5/02* (2006.01)
*B66C 23/00* (2006.01)
*B08B 13/00* (2006.01)

(52) U.S. Cl.
CPC .............. *B60P 1/5409* (2013.01); *B66C 5/02* (2013.01); *B66C 23/00* (2013.01)

(58) Field of Classification Search
USPC ...................................................... 296/24.32
See application file for complete search history.

(56) References Cited

U.S. PATENT DOCUMENTS

| | | | |
|---|---|---|---|
| 2011/0316299 A1* | 12/2011 | Mccoubrey | ............... B60P 3/14 296/24.32 |
| 2013/0118948 A1* | 5/2013 | Noyes | .................. G01N 23/223 206/569 |
| 2014/0207526 A1* | 7/2014 | Noyes | ................ G06Q 30/0283 705/7.35 |
| 2016/0016599 A1* | 1/2016 | Harber | .................... E06C 1/125 280/651 |
| 2016/0264035 A1* | 9/2016 | Brand | ....................... B60P 3/14 |

FOREIGN PATENT DOCUMENTS

| | | |
|---|---|---|
| CN | 105226541 A | 1/2016 |
| CN | 105464418 A | 4/2016 |

\* cited by examiner

MOBILE-TYPE POWER EQUIPMENT MAINTENANCE DEVICE

TECHNICAL FIELD OF THE INVENTION

The invention relates to the technical field of an electrical maintenance apparatus, specifically to a mobile-type maintenance square-shaped bin.

TECHNICAL BACKGROUND OF THE INVENTION

With the rapid development of a power industry, the reliable operation of the grid is increasingly important, how to ensure the stability of the power is particularly important for the rapid maintenance of power equipment; however, for the existing maintenance, we often need to first determine the equipment to be maintained, and then determine which tools are needed to maintain the equipment, then the equipment to be maintained is opened to find the source of the fault, for which, we can replace or maintain a part, then we shall look for an accessory in a tool room, this delays the time, therefore, the existing maintenance mode has many drawbacks, furthermore, some power equipment requires special working environment without dust or with suitable humidity, which cannot be provided by the existing maintenance mode.

CN201310706664.5 discloses an electrical maintenance operation platform, comprising: a first hoop; a second hoop, the first hoop and the second hoop are provided on and under a telegraph post at regular intervals; a loading platform, one end of the loading platform is provided on the first loop; and a climbing device, a first end of the climbing device is connected on the second hoop, and a second end of the climbing device is connected to a second end of the loading platform, which is distant from the telegraph post. Regardless of whether the telegraph post is slippery in the rain day, an electrical maintenance platform can stably support the urgent maintenance staff standing on the loading platform, therefore, the urgent maintenance staff can smoothly climb the post in a raining day and timely carry out power urgent maintenance operation, thereby facilitating a power-failure line to have power restoration in a timely manner, and improving the reliability of a power supply line; however, the invention has the disadvantage of failing to provide a suitable maintenance environment.

The invention with Application No CN201510850350.1 discloses an isolating switch maintenance platform device, comprising a maintenance platform, a fixed device provided on a lower end surface of the maintenance platform, and a hitching device provided on an upper end surface of the maintenance platform, wherein a sliding groove passing through a left side surface and a right side surface is provided on the lower end surface of the maintenance platform, the fixed device comprises an upper plate, a lower plate and a side plate connected between the upper plate and the lower plate, a sliding block is provided on an upper end surface of the upper plate, the sliding block is matched and mounted in the sliding groove, a threaded through hole is provided on the side plate, a screw is rotated and provided in the threaded through hole, a tight nut is matched and provided on the screw. The invention has the advantages of a simple structure, a reliable and safe connection with a based channel steel, low manufacturing cost, simple operation and easy maintenance; however, the invention cannot provide a good working environment for maintenance, cannot neaten and fix small parts during maintenance, and has a relatively messy scene.

The invention with application No. CN201410277506.7 provides an isolating switch electrical maintenance platform, comprising two concrete columns and a horizontal sliding passage fixedly provided on the concrete columns, wherein each concrete column is connected thereon with a supporting frame through a hoop, a long access plate is provided on two sides of two supporting frames respectively, a front connection plate, a middle connection plate and a back connection plate are provided in a gap between two long access plates via an insertion and connection manner, a plurality of groups of sleeve pipes is provided at an outer edge of the long access plate at regular intervals, a guard bar is sleeved in each group of the sleeve pipes, the guard bar forms a closed fence therebetween through an inserted pin connection, a removable rotary disc is provided at one side of the horizontal sliding passage, an upright column is provided on the rotary disc, a hanging frame is fixedly provided at an upper portion of the upright column, an electrical hoist is mounted on the hanging frame. The invention has the following effects: the electrical hoist can save manpower, guarantee the continuity during a lifting process and minimize the damage of equipment, a broad working area on the platform can guarantee the safety of the equipment and staff on the maintenance platform. However, the invention is still adapt to an environment but cannot create an environment, therefore, site maintenance cannot be carried out under extreme conditions such as rainy weather, a high-voltage switch shall be moved to elsewhere so as to be maintained, having a relatively big use limitation.

CN201010209234.9 discloses an isolating platform for a distribution network with hot-line work in a power system, comprising a fixed assembly for being fixed on an electrical post, an insulating support assembly for support and operation, and a rotary mechanism for connecting the support assembly and the fixed assembly, the fixed assembly comprises a hoop body which is integrally annular and can be opened and closed, the rotary mechanism comprises a stop frame slidably connected with an upper end of the hoop, a transmission rod fixedly connected with the stop frame, and a transmission wheel axially connected with the transmission rod, the support assembly comprises a flat plate being parallel with a horizontal plane and removably connected with the stop frame of the rotary mechanism, a fence removably connected with the flat plate and having an over 0.4 m of distance away from the electrical post, and a supporting rod obliquely connected under the flat plate and between the flat plate and the rotary mechanism; however, it has a narrow applicable scope and still has a poor working-environment phenomenon.

In addition, when power equipment is maintained with the prior art, for example, when an isolating switch and a transformer are maintained, its removed parts and components, especially a relatively long component such as a conductive arm in the isolating switch and so on, as well as a big component such as a coil in the transformer and so on, are often placed on the ground due to no reasonable placing locations, therefore, the dirt in these parts and components is cleaned inconveniently and inefficiently. In addition, a screw, a nut and a washer and other small parts are often lost and damaged; furthermore, the disassembly and maintenance for the isolating switch or the transformer is a power operation with highly standardized operational requirements, Non-standard placing work can easily lead to confusion in the work scene and security risk, and can also cause a great impact on the maintenance work.

SUMMARY OF THE INVENTION

In view of this, the present invention provides a mobile-type maintenance square-shaped bin, during the movement, the bin provides a suitable environment for the maintenance operation of power equipment, thus avoiding moist air with more dust to damage an internal part in the power equipment, ensuring smooth and safe maintenance and operation, and providing great convenience for maintenance operation.

To solve the above-mentioned technical problem, the present invention adopts the following technical solution:

A mobile-type maintenance square-shaped bin comprises a bin body, a travelling mechanism provided under the bin body, a car head connected with one end of the bin body, an inlet and an outlet provided at the other end of the bin body, a sealed door provided on the inlet and the outlet, an allocation and transportation device mutually connected with a microcomputer signal provided at a front end of the bin body as well as provided over an internal portion of the bind body, a maintenance platform provided at a bottom of the internal portion of the bin body, a tool platform provided adjacently to the maintenance platform, an ash-removal mechanism provided at an upper portion of the maintenance platform, an air-conditioning device provided at an outer portion of the bin body, and a scanning mechanism provided at a front portion of the maintenance platform.

The scanning mechanism comprises a scanning chamber provided with a movable isolating door and able to be lifted and dropped, an apparatus identification camera provided at the inlet and the outlet of the bin body, a rotatory lifting and dropping platform provided in the scanning chamber, a radiation source provided at one side of the lifting and dropping platform, a detector opposite to the radiation source, and the microcomputer connected with the apparatus identification camera, the radiation source and the detector.

The scanning chamber is connected with a lower surface in the bin body via a lifting and dropping rod, the cross section of the movable isolating door has an inverted U shape.

The lifting and dropping rod is a hydraulic lifting and dropping rod and/or an electrical extendable rod.

An annular orbit is provided on a supporting plate in the maintenance platform, the ash-removal device consisting of a plurality of ball-piece units is provided on the annular orbit, the ball-piece unit comprises an inverted V-shaped elastic column, an ash-removal cloth provided in the middle of the inverted V-shaped elastic column, and a ball-shaped sliding block provided at a lower portion of the inverted V-shaped elastic column and matched with the annular orbit.

A hoisting device comprises translation sliding rails provided over two sides of the bin body, a frame bridge is provided on the translation sliding rails, a translation motor and a driving wheel are provided at one end of the frame bridge, an electrical hoist is provided on the frame bridge, and an electromagnetic snap ring is provided at a lower portion of the electrical hoist.

The maintenance platform comprises a supporting frame, a sliding groove is provided at two sides of an upper portion of the supporting frame, a supporting plate is opposite to the sliding groove and provided over the supporting frame, a translation supporting mechanism is provided at an end of the supporting plate, a cleaning platform is provided in the supporting frame.

The cleaning platform adopts an ultrasonic cleaner, a sealed ring is movably provided on the supporting frame and opposite to an edge of the supporting plate.

A pulling wire is provided in the annular orbit and fixedly matched with the ball-shaped sliding block at a most front end thereof, an opening motor is provided at one end of the pulling wire and a closing motor is provided at the other end of the pulling wire.

An offset motor is provided between the opening motor and the closing motor, an output shaft of the offset motor is connected with an upper portion of the ball-piece unit provided at an end of the annular orbit and fixed.

An annular supporting ring is provided between a plurality of ball-piece units, a dust suction inlet annularly provided on the supporting plate in the annular orbit and a starting end of an annular gas ejection pipe at a middle portion of the ball-piece unit provided at an end of the annular orbit and fixed are connected with each other, a gas nozzle forming a fixed angle with a plane of an isolating cloth is provided on the gas ejection pipe.

A working plate is provided on an upper portion of the supporting plate via a hydraulic rod, an elastic cover plate is provided at the annular sliding rails, the dust suction inlet, the opening motor, the closing motor and the offset motor by the working plate.

An inverted Y-shaped sealed ring is provided at a periphery of the elastic cover plate.

A magnetic receiving box is provided at an edge of the supporting frame.

The tool platform comprises a rotary shaft, a cross supporting rod is provided on the rotary shaft, a tray is provided at an end of the cross supporting rod, the rotary shaft is in transmission connection with a rotary motor.

The air-conditioning device comprises a temperature and moisture sensor, a gas-pressure sensor, a controller, a heater, a gas-intake pipeline and a gas-discharge pipeline, a gas-intake fan, a drying mechanism and a gas-intake valve are provided in the gas-intake pipeline, a gas-discharge fan and a gas-discharge valve are provided in the gas-discharge pipeline, the temperature and moisture sensor, the gas-pressure sensor, the heater, the gas-intake fan, the gas-discharge fan are connected with the controller, the controller is connected with the microcomputer.

A circle of the gas-discharge pipeline is provided under an inner portion of the bin body, a gas-outlet hole is provided on the gas-discharge pipeline.

A lower edge of the sealed door is hinged with the bin body, an automatically opening and closing mechanism is provided on the sealed door.

A circle of grooves are provided at a periphery of the sealed door, a sealed gasbag is provided in the groove, the sealed gasbag is connected with a gas pump via a pneumatic hose.

Climbing sliding rails are provided in the middle of the sealed door, a lifting and dropping plate is slidably provided on the climbing sliding rails, a fixed rope body is provided on the lifting and dropping plate.

A lifting mechanism is provided over the bin body.

The present invention provides a mobile-type maintenance square-shaped bin, the square-shaped bin can provide a stable working environment for the maintenance of power equipment, furthermore, as the power equipment is often exposed to a natural environment, its maintenance will become more difficult if it is a raining day, a snow day, a wind and sand day and other inclement weathers, moreover, part of power equipment even requires an environment with stable gas pressure, no dust, and appropriate humidity, otherwise, a part of parts of the power equipment will be caused with irreversible damage and affect subsequent use; the bin body is provided at an active type, and can match with a car head via a travelling mechanism provided under a lower portion of the bin body, a separate travelling mechanism is provided, the square-shaped bin can be conveniently moved to the best maintenance position via the pulling of a car or a separate car head in the form of full traction or semi-traction, the equipment to be maintained is conveyed to a lifting and dropping plate at a sealed door via a lifting mechanism and fixed with a fixed rope body, then the power equipment is allocated and transported to an inner portion of the bin body via an allocation and transportation device, during the allocation and transportation process, as the apparatus identification camera scans the equipment, the microcomputer obtains a structure information of the equipment, and preliminarily determines a general direction of a problem according to the cause of a failure, and then the equipment is transported to a rotary lifting and dropping platform of a scanning mechanism, the sealed door is closed at the same time, an electrical hoist is then released, a movable isolating door is closed, the microcomputer is controlled to scan a specific place of the equipment and obtain three-dimensional information of its fault, the power equipment is compared with new power equipment so as to determine whether the specific place is a damaged place, if yes, the movable isolating door is opened, the power equipment is hoisted, allocated and transported to an ash-removal mechanism via the electrical hoist, after the dust of the power equipment is removed by the ash-removal mechanism, each parameter of the air in the bin body is adjusted by an air-conditioning device, if the air is too moist and has too much dust, its temperature is raised and the air is discharged or replaced to improve the environment in the bin body; the power device is placed on a maintenance platform, a dust-removal device is provided on the maintenance platform, to be able to remove the dust on the power equipment before the maintenance, a tool platform is provided beside the maintenance platform, to facilitate the staff to access at any tool or replace any part and easily start work; this device can increase by more than three times the whole maintenance speed, achieve the all-weather attendance and avoid the maintenance difficulty caused by harsh environment.

The invention has the following advantageous effects:

1. During the movement, the square-shaped bin provides a suitable environment for the maintenance operation of power equipment, avoids moist air with more dust to damage an inner part of the power equipment, ensures the smooth and safe conduction for the maintenance operation, provides much convenience for the maintenance operation, and realizes all-weather attendance;

2. A hosting device can hoist and transport the power equipment in an inner portion of a bin body, thereby facilitating the transportation of a big par or a big device, and reducing the burden on staff, wherein only one person can finish the operation;

3. An ash-removal device and a cleaning device are provided on the maintenance platform, therefore, after the ash can be removed wholly, a part of parts are deeply cleaned, for example, a bus clip of a transformer, a surface of an insulator, a transformer coil and so on; an ultrasonic cleaner can totally remove grease and dirt in a totally-enclosed manner without a cleaning agent, the totally-enclosed manner will not affect the environment in the bin body;

4. The staff can obtain a tool or a part from a rotary-type tool platform, thereby facilitating greatly maintenance work, reducing the burden of maintenance staff, improving the working efficiency of the staff by five times, and realizing a single-man operation;

5. The air-conditioning device can adjust the humidity of the air in the bin body and the content of particulate matters, thereby providing a favorable environment for the maintenance work;

6. An apparatus identification camera can directly obtain the concrete type of an apparatus during the apparatus is lifted, a microcomputer directly obtains its structural diagram, preliminarily determines the reason of a problem according to the categories of existing failures, scans the power equipment, obtains three-dimensional image of this place, and compares the power equipment with new power equipment to determine whether there is a problem at this place, thereby reducing the searching time of the failure, and greatly improving the work efficiency.

BRIEF DESCRIPTION OF THE DRAWINGS

With the combination of the figures, the invention is further described as follows.

EMBODIMENTS OF THE INVENTION

Figure 1:
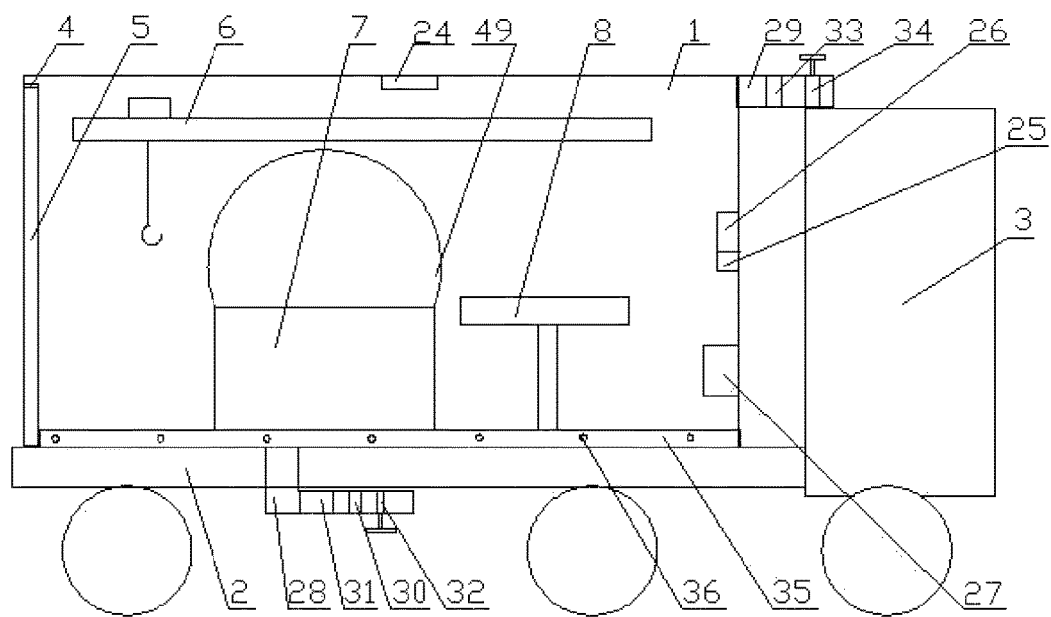
FIG. 1 is an integral structure diagram of the invention.
Figure 2:
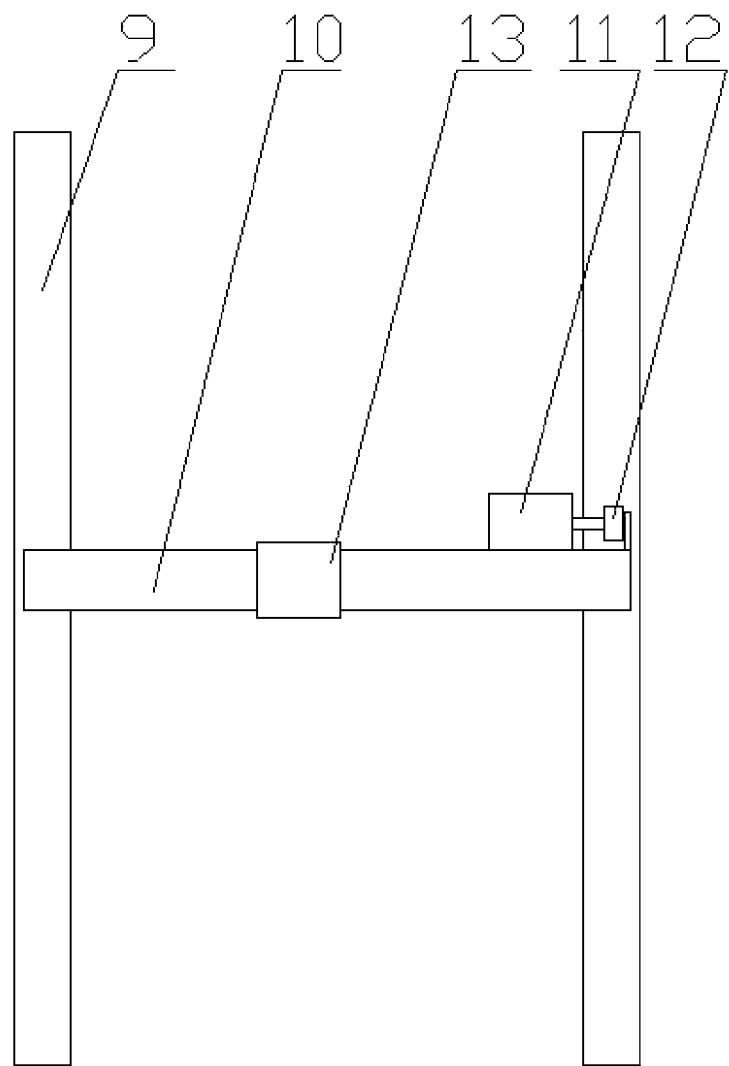
FIG. 2 is a structure diagram of an allocation and transportation device of the invention.
Figure 3:
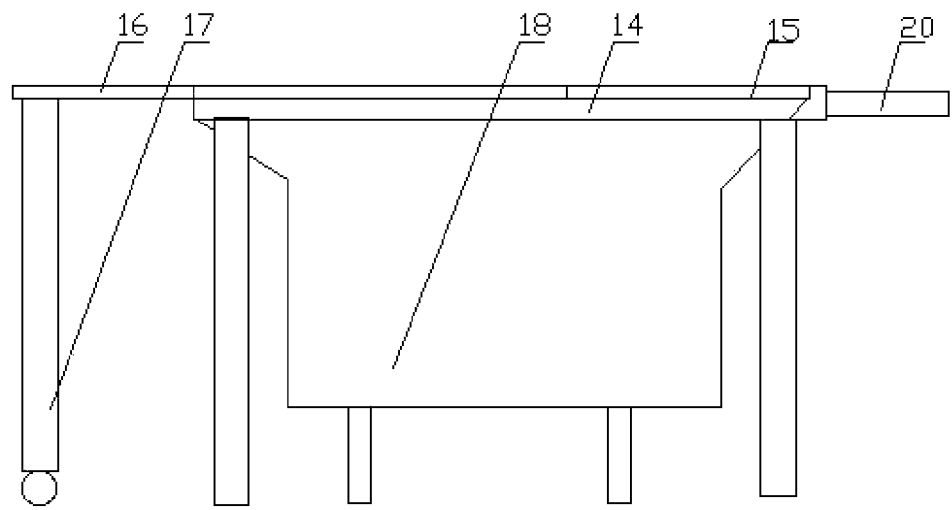
FIG. 3 is a side structure diagram of a maintenance platform of the invention.
Figure 4:
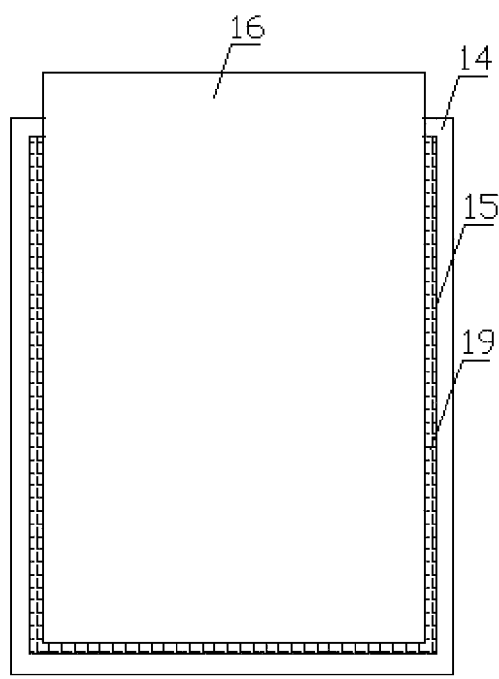
FIG. 4 is a top structure diagram of a maintenance platform of the invention.
Figure 5:
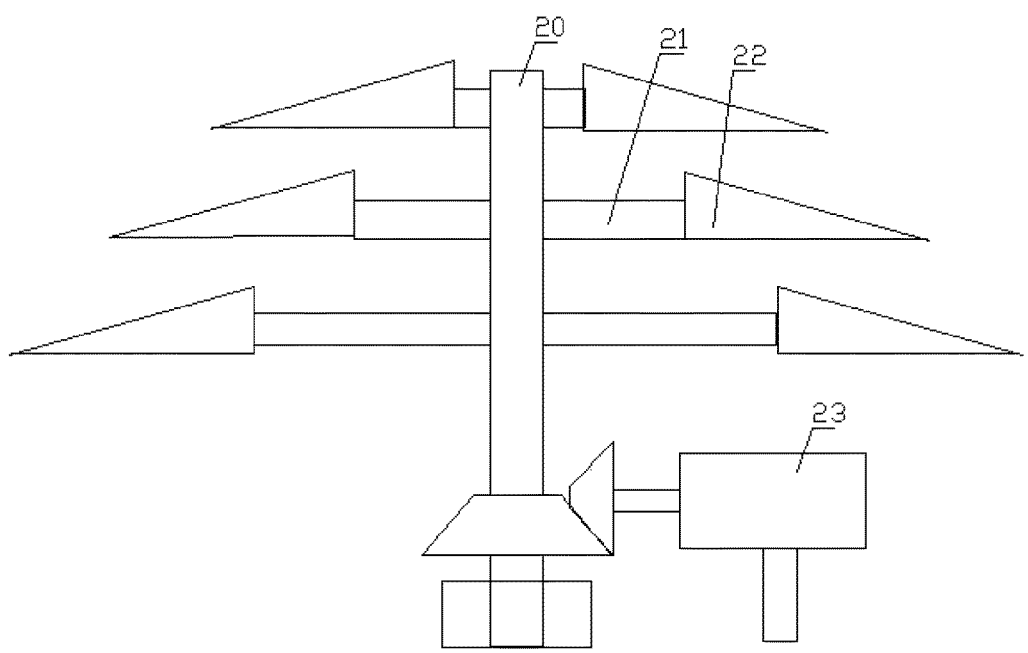
FIG. 5 is a structure diagram of a tool platform of the invention.
Figure 6:
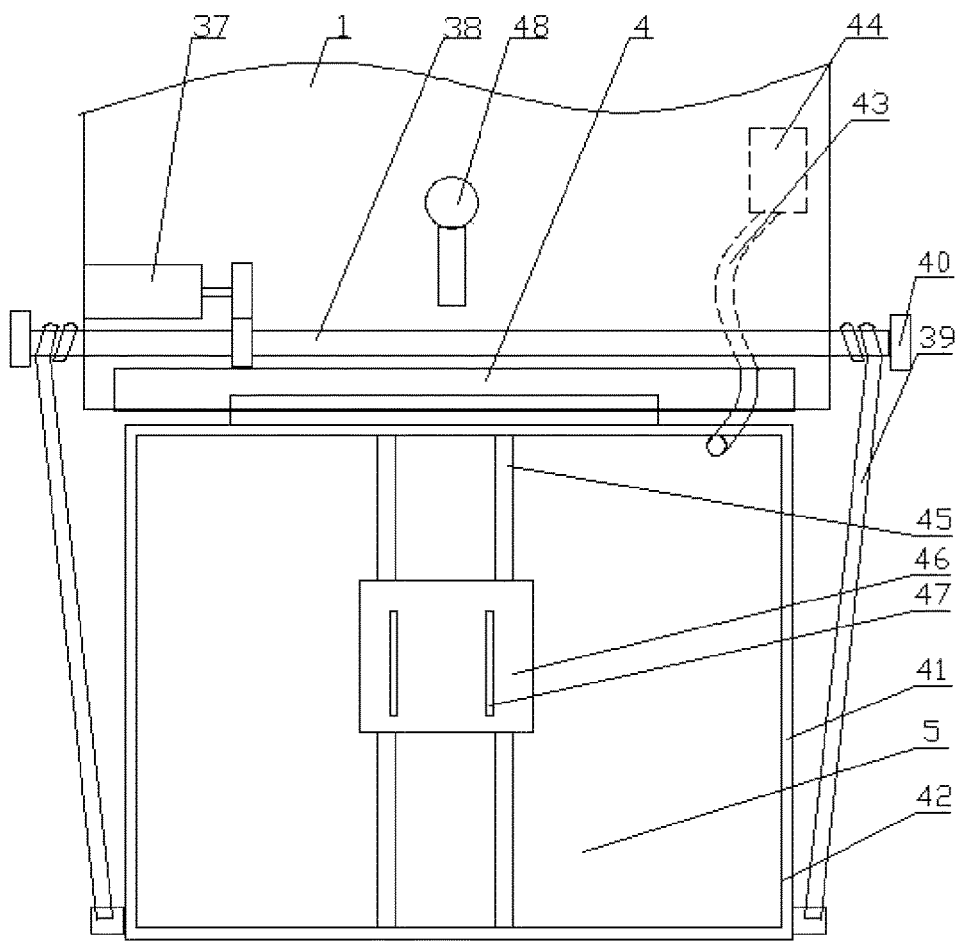
FIG. 6 is an integral side structure diagram of the invention.
Figure 7:
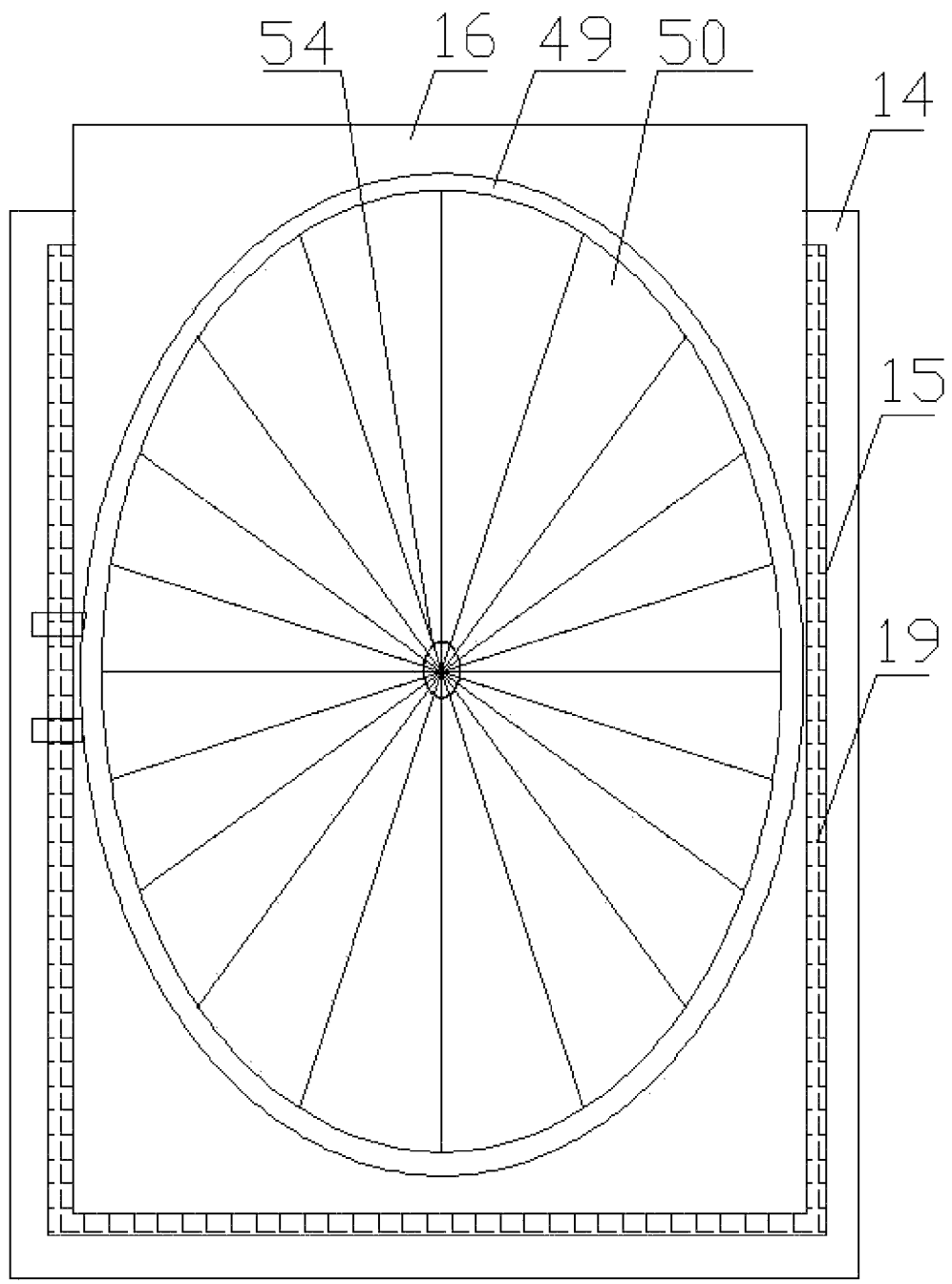
FIG. 7 is an another top structure diagram of a maintenance platform of the invention.
Figure 8:
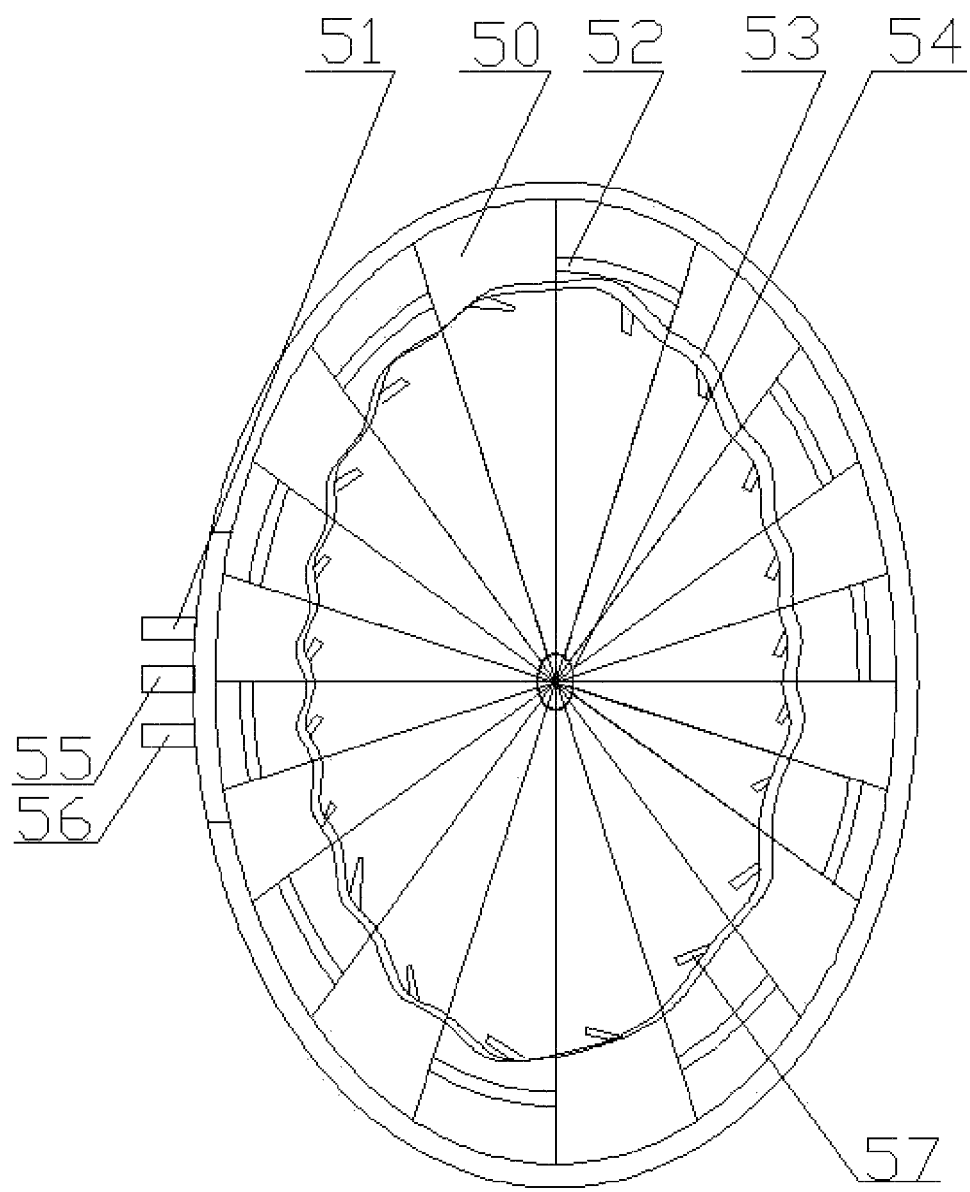
FIG. 8 is a top structure diagram of an ash-removal mechanism of the invention.
Figure 9:
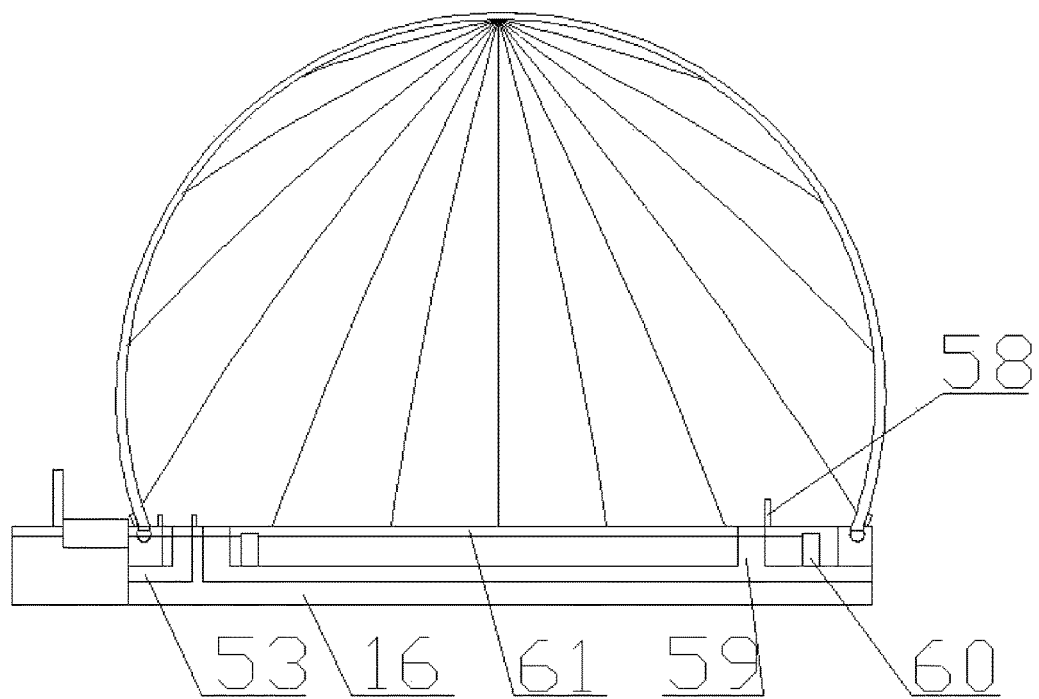
FIG. 9 is a side structure diagram of an ash-removal mechanism of the invention.
Figure 10:
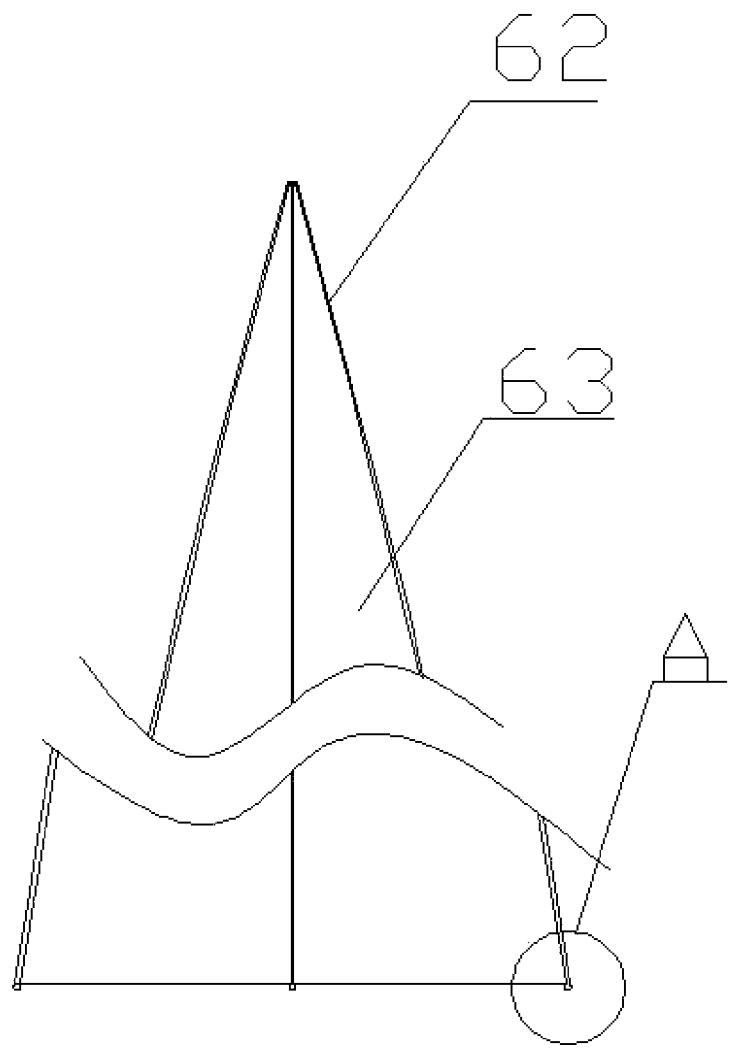
FIG. 10 is a structure diagram of a ball-piece unit of the invention.
Figure 11:
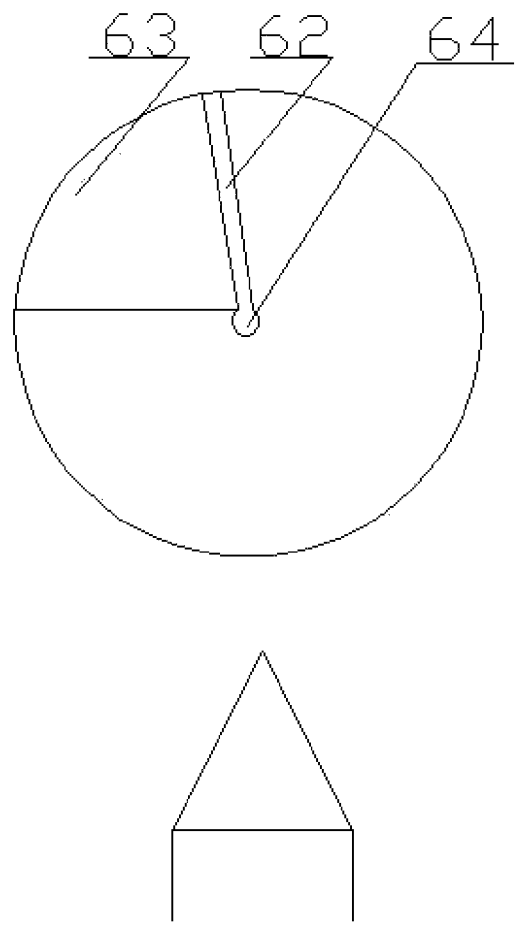
FIG. 11 is a structural enlarged diagram of a lower end of a ball-piece unit of the invention.
Figure 12:
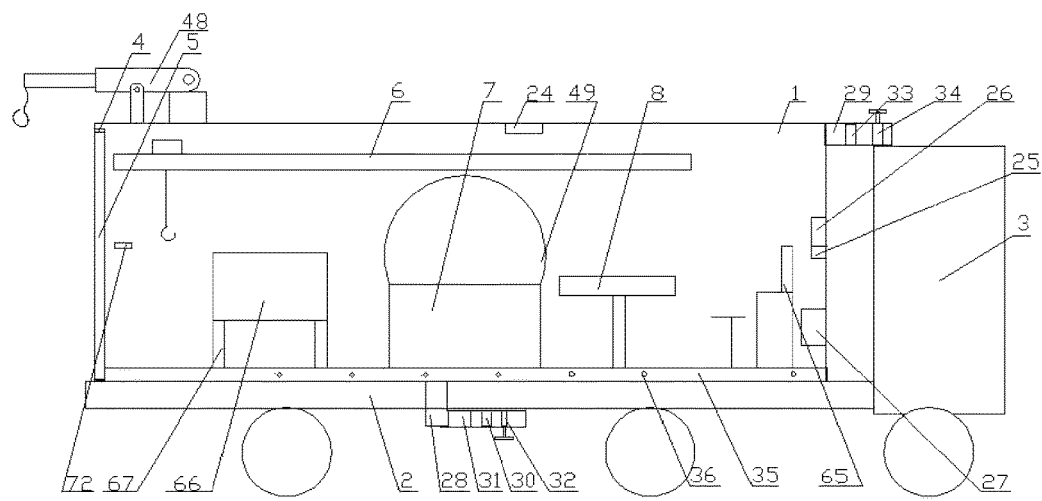
FIG. 12 is another integral structure diagram of the invention.
Figure 13:
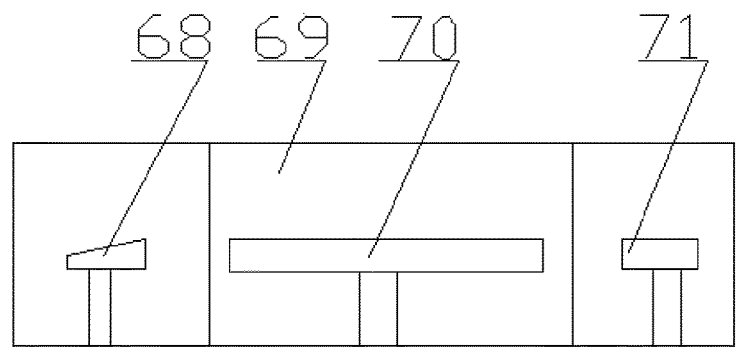
FIG. 13 is a structure diagram of a scanning mechanism of the invention.

With the combination of FIGS. 1-13, the technical solutions of the invention are further explained and embodiments are as follows:

Example 1

A mobile-type inspection square-shaped bin comprises a bin body 1, a travelling mechanism 2 provided under the bin body 1, a car head 3 connected with one end of the bin body 1, an inlet and an outlet 4 provided at the other end of the bin body 1, a sealed door 5 provided on the inlet and the outlet, an allocation and transportation device 6 mutually connected with a microcomputer 65 signal provided at a front end of the bin body 1 as well as provided over an internal portion of the bind body 1, an inspection platform 7 provided at a bottom of the internal portion of the bin body 1, a tool platform 8 provided adjacently to the inspection platform 7, an ash-removal mechanism provided at an upper portion of the inspection platform 7, an air conditioning device provided at an outer portion of the bin body 1, and a scanning mechanism 66 provided at a front portion of the inspection platform 7.

The present invention provides a mobile-type maintenance square-shaped bin, the square-shaped bin can provide a stable working environment for the maintenance of power equipment, furthermore, as the power equipment is often exposed to a natural environment, its maintenance will become more difficult if it is a raining day, a snow day, a wind and sand day and other inclement weather, moreover, part of power equipment even requires an environment with stable gas pressure, no dust, and appropriate humidity, otherwise, a part of parts of the power equipment will be caused with irreversible damage and affect subsequent use; the bin body is provided at an active type, and can match with a car head via a travelling mechanism provided under a lower portion of the bin body, a separate travelling mechanism is provided, the square-shaped bin can be conveniently moved to the best maintenance position via the pulling of a car or a separate car head in the form of full traction or semi-traction, the equipment to be maintained is conveyed to a lifting and dropping plate at a sealed door via a lifting mechanism and fixed with a fixed rope body, then the power equipment is allocated and transported to an inner portion of the bin body via an allocation and transportation device, during the allocation and transportation process, as the apparatus identification camera scans the equipment, the microcomputer obtains a structure information of the equipment, and preliminarily determines a general direction of a problem according to the cause of a failure, and then the equipment is transported to a rotary lifting and dropping platform of a scanning mechanism, the sealed door is closed at the same time, an electrical hoist is then released, a movable isolating door is closed, the microcomputer is controlled to scan a specific place of the equipment and obtain three-dimensional information of its fault, the power equipment is compared with new power equipment so as to determine whether the specific place is a damaged place, if yes, the movable isolating door is opened, the power equipment is hoisted, allocated and transported to an ash-removal mechanism via the electrical hoist, after the dust of the power equipment is removed by the ash-removal mechanism, each parameter of the air in the bin body is adjusted by an air-conditioning device, if the air is too moist and has too much dust, its temperature is raised and the air is discharged or replaced to improve the environment in the bin body; the power device is placed on a maintenance platform, a dust-removal device is provided on the maintenance platform, to be able to remove the dust on the power equipment before the maintenance, a tool platform is provided beside the maintenance platform, to facilitate the staff to access at any tool or replace any part and easily start work; this device can increase by more than three times the whole maintenance speed, achieve the all-weather attendance and avoid the maintenance difficulty caused by harsh environment.

The hoisting device 6 comprises translation sliding rails 9 provided on a top of two sides in the bin body 1, a frame bridge 10 is provided on the translation sliding rails 9, a translation motor 11 and a driving wheel 12 are provided at one end of the frame bridge 10, an electrical hoist 13 is provided on the frame bridge 10. As the translation sliding rails are provided at an upper portion of the bin body, it does not occupy the room in the bin body, the translation motor outputs power supply to rotate the driving wheel and drive the frame bridge to move on the translation sliding rails, the electrical hoist realizes a lifting function.

Example 2

A mobile-type inspection square-shaped bin comprises a bin body 1, a travelling mechanism 2 provided under the bin body 1, a car head 3 connected with one end of the bin body 1, an inlet and an outlet 4 provided at the other end of the bin body 1, a sealed door 5 provided on the inlet and the outlet, an allocation and transportation device 6 mutually connected with a microcomputer 65 signal provided at a front end of the bin body 1 as well as provided over an internal portion of the bind body 1, an inspection platform 7 provided at a bottom of the internal portion of the bin body 1, a tool platform 8 provided adjacently to the inspection platform 7, an ash-removal mechanism provided at an upper portion of the inspection platform 7, an air conditioning device provided at an outer portion of the bin body 1, and a scanning mechanism 66 provided at a front portion of the inspection platform 7.

The maintenance platform 7 comprises a supporting frame 14, a sliding groove 15 is provided at two sides of an upper end of the supporting frame 14, a supporting plate 16 is opposite to the sliding groove 15 and provided over the supporting frame 14, a translation supporting mechanism 17 is provided at an end of the supporting plate 16, a cleaning platform 18 is provided in the supporting frame 14. Power equipment is placed on the supporting plate during the maintenance, the translation supporting mechanism consists of a post and wheels, thereby facilitating the translation of the supporting plate, when some parts are needed to be cleaned, the supporting plate is translated and a cleaning platform under the supporting frame is exposed, parts and components to be cleaned are put in the cleaning platform to be treated, thus providing great convenience for the maintenance operation, and greatly reducing the time needed by the maintenance operation.

The cleaning platform 18 adopts an ultrasonic cleaner, a sealed ring 19 is movably provided on the supporting frame 14 and opposite to an edge of the supporting plate 16, with ultrasonic cleaning principle, the ultrasonic cleaner applies ultrasonic wave on a cleaning solvent, so that the cleaning solvent produces a large amount of tiny bubbles which are vibrated and ruptured and produce tremendous pressure and heat in a very small range, without a cleaning agent, only water can strongly get rid of the dirt and grease on a surface of parts and components, furthermore, the ultrasonic cleaner can cooperate with the supporting plate, when the parts and components are washed, the supporting plate is returned, thus avoiding the situation that a large amount of water mist is suffused, facilitating the control over the environment in the bin body and no resulting in the moisture or condensation over other parts and components, the provided sealed ring can be filled with a flexible material or use a cover plate fitted with the supporting frame, thus realizing the seal of a contact surface between the supporting plate and the supporting frame.

A magnetic receiving box 20 is provided at an edge of the supporting frame 14, during the maintenance operation, the magnetic receiving box can collect a screw, a nut, a small spring and other parts, thus avoiding the parts to be scattered on the maintenance platform or in the inner portion of the bin body and hence resulting in that the maintenance staff cannot rapidly find them or that the parts are lost, which may influence the process of the maintenance operation.

The tool platform comprises a rotary shaft 20, a cross supporting rod 21 is provided on the rotary shaft 20, a tray 22 is provided at an end of the cross supporting rod 21, the rotary shaft 20 is in transmission connection with a rotary motor 23, a tool in the prior art is placed in a cabinet body, but the cabinet body is far away from the maintenance platform, so the maintenance staff have to go to the cabinet and select the tool, which is a waste of time. For the tool platform of the invention, the tool and vulnerable parts of the power equipment are carried on the tray, furthermore, the tool platform is provided beside the maintenance platform, when some tool is needed, a handle is operated to drive and rotate the motor to rotate a rotary shaft, and then the corresponding placed tray is rotated to be beside the staff for access, without delay and interrupting ongoing work, which is more convenient and fast.

Example 3

A mobile-type inspection square-shaped bin comprises a bin body 1, a travelling mechanism 2 provided under the bin body 1, a car head 3 connected with one end of the bin body 1, an inlet and an outlet 4 provided at the other end of the bin body 1, a sealing door 5 provided on the inlet and the outlet, an allocation and transportation device 6 mutually connected with a microcomputer 65 signal provided at a front end of the bin body 1 as well as provided over an internal portion of the bind body 1, an inspection platform 7 provided at a bottom of the internal portion of the bin body 1, a tool platform 8 provided adjacently to the inspection platform 7, an ash-removal mechanism provided at an upper portion of the inspection platform 7, an air conditioning device provided at an outer portion of the bin body 1, and a scanning mechanism 66 provided at a front portion of the inspection platform 7.

The air-conditioning device comprises a temperature and moisture sensor 24, a gas-pressure sensor 25, a controller 26, a heater 27, a gas-intake pipeline 28 and a gas-discharge pipeline 29, a gas-intake fan 30, a drying mechanism 31 and a gas-intake valve 32 are provided in the gas-intake pipeline 28, a gas-discharge fan 33 and a gas-discharge valve 34 are provided in the gas-discharge pipeline 29, the temperature and moisture sensor 24, the gas-pressure sensor 25, the heater 27, the gas-intake fan 30, the gas-discharge fan 33 are connected with the controller 26, the temperature and moisture sensor monitors the temperature and moisture in the bin body while the gas-pressure sensor monitors the gas pressure in the bin body, when the moisture is relatively high, the heater is opened and the temperature is raised, so that the moisture is fully entered into air, the gas-intake fan and the gas-discharge fan are opened, the moist gas in the bin body is discharged, the outside air which is dried via a drying mechanism is introduced, thus realizing the adjustment for the moisture. When the temperature in the bin body is too low, the operation flexibility of the maintenance staff will be influenced, the better maintenance environment can be provided for the operation staff by raising the temperature by the heater, the gas-discharge valve and the gas-intake valve still can cooperate with the gas-discharge fan and a gas-exchange fan to create a negative pressure environment, thus being suitable for the maintenance of a device with more precise and extreme high insulation requirement, and having great function. The heater can use a heating wire for heating, the drying mechanism can use an allochroic silicagel, the use conditions of the drying mechanism can be observed very conveniently, so that the drying mechanism can be replaced in time.

A circle of the gas-discharge pipeline 35 is provided under an inner portion of the bin body 1, a gas-outlet hole 36 is provided on the gas-discharge pipeline 35 evenly. A circle of the gas-outlet pipeline is provided, and hence can evenly introduce the outside air into a bottom of the bin body, thus conveniently discharging the original moist and hot air in the bin body from a top thereof.

Example 4

A mobile-type inspection square-shaped bin comprises a bin body 1, a travelling mechanism 2 provided under the bin body 1, a car head 3 connected with one end of the bin body 1, an inlet and an outlet 4 provided at the other end of the bin body 1, a sealing door 5 provided on the inlet and the outlet, an allocation and transportation device 6 mutually connected with a microcomputer 65 signal provided at a front end of the bin body 1 as well as provided over an internal portion of the bind body 1, an inspection platform 7 provided at a bottom of the internal portion of the bin body 1, a tool platform 8 provided adjacently to the inspection platform 7, an ash-removal mechanism provided at an upper portion of the inspection platform 7, an air conditioning device provided at an outer portion of the bin body 1, and a scanning mechanism 66 provided at a front portion of the inspection platform 7. A lower edge of the sealed door 5 is hinged with the bin body 1, an automatically opening and closing mechanism is provided on the sealed door 5. The automatically opening and closing mechanism comprises an opening and closing motor 37 provided in the bin body 1, the opening and closing motor 37 is in transmission connection with a transmission shaft 38, the transmission shaft 38 extends out of two sides of the bin body 1, an opening and closing chain 39 is twined and provided at two ends do the transmission shaft 38, the opening and closing chain 39 is connected with the sealed door 5, a stop block 40 is provided at two ends of the transmission shaft 38. A lower side of the sealed door is hinged with the bin body, when the sealed door is opened, its upper side contacts the ground, so that the staff conveniently climb up and down and power equipment is conveniently transported. The automatically opening and closing mechanism twines or extends the opening and closing chain via the rotation of the transmission shaft, thus realizing the opening and closing control of the sealed door. The transmission shaft is provided at an upper portion of the bin body, the opening and closing chain is connected with two ends of an upper side of the sealed door, thus having safer use and no influencing the room in the bin body and the operation of the staff.

A circle of grooves 41 are provided at a periphery of the sealed door 5, a sealed gasbag 42 is provided in the groove 41, the sealed gasbag 42 is connected with a gas pump 44 via a pneumatic hose 43, a gap is provided between the sealed door as well as the inlet and outlet after the sealed door is closed, at this time, the sealed gasbag 42 is supported via the aeration of the gas pump 44, the gap is sealed, this sealed manner has a simple structure and is very conveniently used, furthermore, when the sealed gasbag is not sealed, the sealed gasbag is contracted into the groove, therefore, the gasbag is not ruptured due to the rub of an edged tool at outside and affects sealed effect.

Climbing sliding rails are provided in the middle of the sealed door 5, a lifting and dropping plate 46 is slidably provided on the climbing sliding rails 45, a fixed rope body 47 is provided on the lifting and dropping plate 46. When the power equipment is needed to be transported to the bin body, the power equipment shall be first placed on the lifting and dropping plate and fixed by the fixed rope, the power equipment is hooked by a hoisting device in the bin body, then the power equipment is lifted obliquely along the climbing sliding rails via the hoisting device, thus realizing the transportation of the power equipment and ensuring the security of the power equipment during the transportation.

A lifting mechanism 48 is provided over the bin body 1, if the lifting mechanism is provided, a strengthened beam is needed to be mounted at a corresponding place of the bin body, thus ensuring the solidness of the bin body, a balancing rod is provided at two sides of the bin body, thus ensuring the stability during the lifting and transporting process. The provided lifting mechanism can mount or disassemble and drop the power equipment in upper air, thus no needing an extra crane and having convenient maintenance operation.

Example 5

Example 5 is distinct from Examples 1-4 in that: an annular orbit 49 is provided on a supporting plate 16, an ash-removal device consisting of a plurality of ball-piece units 50 is provided on the circular orbit 49, the ball-piece unit 50 comprises an inverted V-shaped elastic column 62, an ash-removal cloth 63 provided in the middle of the inverted V-shaped elastic column 62, and a ball-shaped sliding block 64 provided at a lower portion of the inverted V-shaped elastic column 62 and matched with the annular orbit 49.

A pulling wire is provided in the circular orbit 49 and fixedly matched with the ball-shaped sliding block at a most front end thereof, an opening motor 51 is provided at one end of the pulling wire and a closing motor 56 is provided at the other end of the pulling wire.

An offset motor 55 is provided between the opening motor 51 and the closing motor 56, an output shaft of the offset motor 55 is connected with an upper portion of the ball-piece unit 50 provided at an end of the annular orbit 49 and fixed.

An annular supporting ring 54 is provided between a plurality of the ball-piece units 50, a dust suction inlet 52 annularly provided on the supporting plate 16 in the annular orbit 49 and a starting end of an annular gas ejection pipe 53 at a middle portion of the ball-piece unit 50 provided at an end of the annular orbit 49 and fixed are connected with each other, a gas nozzle 57 forming a fixed angle with a plane of an isolating cloth is provided on the gas ejection pipe 53.

A working plate 61 is provided on an upper portion of the supporting plate 16 via a hydraulic rod 60, an elastic cover plate 58 is provided at the annular sliding rails 49, the dust suction inlet 52, the opening motor 51, the closing motor 56 and the offset motor 55 by the working plate 61.

An inverted Y-shaped sealed ring is provided at a periphery of the elastic cover plate 58.

For this example, the annular orbit is provided on the supporting plate, a sealed chamber consisting of a plurality of ball-piece units which can be freely opened and closed is provided on the annular orbit, so that the working plate is dropped by the hydraulic rod after the power equipment to be maintained is lifted to the working plate, and so that the annular orbit on the supporting plate, the dust suction inlet, the opening motor, the closing motor and the offset motor break through the elastic cover plate thereon, then the offset motor is released so that the ball-piece unit is reset, the ball-piece unit is rotated along the annular orbit via the rotation of the opening motor to form the sealed chamber, during the blowing process, the gas nozzle on the ball-piece unit not only obtains good recoil force so that the chamber formed by the ball-piece unit is more sealed, but only can form whirlwind in an inner wall of a ball-shaped chamber so that the dust on the power equipment can be better removed, the gas ejection pipe and the dust suction inlet are connected with a common gas pump and a negative-pressure machine respectively, so that the present device has convenient operation; furthermore, the dust on the device is more conveniently cleaned, thus avoiding the phenomenon that the dust is scattered due to no dust removal during the disassembly process, to easily damage the equipment.

In addition, the ball-piece unit consists of the inverted V-shaped elastic column and the ash-removal cloth, this design can occupy smaller room as far as possible after the closing and provide a flat and broad maintenance surface, furthermore, the controller controls the opening motor, the closing motor and the offset motor, thus more intelligentizing the operation, a spray-head of a Venturi tube is provided at a front portion of the gas nozzle so that the flowing speed of gas flow which is ejected out is higher, thus facilitating the ash removal, during the ash-removal process, the ash is cleaned by a batch type; an annular supporting ring provided at an upper portion of the inverted V-shaped elastic column can obtain a guiding function, thus being able to smoothly form the sealed chamber to remove the dust.

Example 6

Example 6 is distinct from Examples 1-5 in that: a scanning mechanism 66 comprises a scanning chamber provided with a movable isolating door 69 and able to be lifted and dropped, an apparatus identification camera 72 provided at the inlet and the outlet of the bin body 1, a rotatory lifting and dropping platform 70 provided in the scanning chamber, a radiation source 68 provided at one side of the lifting and dropping platform 70, a detector 71 opposite to the radiation source 68, and a microcomputer 65 connected with the apparatus identification camera 72, the radiation source 68 and the detector 71.

The scanning chamber is connected with a lower surface in the bin body 1 via a lifting and dropping rod 67, the cross section of the movable isolating door 69 has an inverted U shape.

The lifting and dropping rod 67 is a hydraulic lifting and dropping rod.

For this example, during the allocation and transportation of the equipment, the apparatus identification camera imports the type of the equipment and the three-dimension structural diagram of the equipment into the microcomputer, preliminarily determines the possible place of a failure according to the known failure conditions of the site, and scans the equipment according to the order of priority to remove the failures one by one, furthermore, as the scanning is a tomoscan, only part of area is scanned, thus reducing the consumption of the equipment caused by a complete scan, being able to fast position to obtain the failure, and further reducing the maintenance time; when obtaining the failure place, the microcomputer can accurately analyze the needed tool and its use order, thus further increasing the maintenance speed of the equipment.

It is needed to describe in the end that the above-mentioned examples are only used as the technical solutions of the present invention and do not limit the present invention, other modifications or equal replacements for the technical solutions of the present invention made by the ordinary persons skilled in the art shall cover the scope of the claims of the present invention without departing from the spirit and scope of the technical solutions of the present invention.

What is claimed is:

1. A mobile-type power equipment maintenance device, comprising:
   a bin body;
   a travelling mechanism provided under the bin body;
   a tractor connected with one end of the bin body;
   an inlet and an outlet provided at the other end of the bin body; and
   a sealed door provided on the inlet and the outlet,
   wherein an allocation and transportation device is connected with a microcomputer and provided over an internal portion of the bin body, a maintenance platform is provided at a bottom of the internal portion of the bin body, a tool platform is provided adjacently to the maintenance platform, an ash-removal mechanism is provided at an upper portion of the maintenance platform, an air-conditioning device is provided at an outer portion of the bin body, and a scanning mechanism is provided at a front portion of the maintenance platform.

2. The mobile-type power equipment maintenance device according to claim 1, wherein the scanning mechanism comprises a scanning chamber provided with a movable isolating door and able to be lifted and dropped, an apparatus identification camera provided at the inlet and the outlet of the bin body, a rotatory lifting and dropping platform provided in the scanning chamber, a radiation source provided at one side of the lifting and dropping platform, a detector opposite to the radiation source, and a microcomputer connected with the apparatus identification camera, the radiation source and the detector.

3. The mobile-type power equipment maintenance device according to claim 1, wherein an annular orbit is provided on a supporting plate in the maintenance platform, the ash-removal device consisting of a plurality of ball-piece units is provided on the annular orbit, the ball-piece unit comprises an inverted V-shaped elastic column, an ash-removal cloth provided on the inverted V-shaped elastic column, and a ball-shaped sliding block provided at a lower portion of the inverted V-shaped elastic column and matched with the annular orbit.

4. The mobile-type power equipment maintenance device according to claim 1, wherein the allocation and transportation device comprises a hoisting device comprising translation sliding rails provided over two sides of the bin body, a frame bridge provided on the translation sliding rails, a translation motor and a driving wheel provided at one side of the frame bridge, an electrical hoist provided on the frame bridge, and an electromagnetic snap ring provided at a lower portion of the electrical hoist.

5. The mobile-type power equipment maintenance device according to claim 1, wherein the maintenance platform comprises a supporting frame, a sliding groove is provided at two sides of an upper portion of the supporting frame, a supporting plate is provided over the supporting frame and opposite to the sliding groove, a translation supporting mechanism is provided at an end of the supporting plate, a cleaning platform is provided in the supporting frame.

6. The mobile-type power equipment maintenance device according to claim 5, wherein the cleaning platform adopts an ultrasonic cleaner, and a sealed ring is movably provided on the supporting frame and opposite to an edge of the supporting plate.

7. The mobile-type power equipment maintenance device according to claim 3, wherein a pulling wire is provided in the annular orbit and fixedly matched with the ball-shaped sliding block at a most front end thereof, an opening motor is provided at one end of the pulling wire, and a closing motor is provided at an opposite end of the pulling wire from the one end of the pulling wire.

8. The mobile-type power equipment maintenance device according to claim 7, wherein an offset motor is provided between the opening motor and the closing motor, and an output shaft of the offset motor is connected with an upper portion of the ball-piece unit provided at an end of the annular orbit and fixed.

9. The mobile-type power equipment maintenance device according to claim 8, wherein an annular supporting ring is provided between a plurality of the ball-piece units, a dust suction inlet is annularly provided on the supporting plate and connected with a starting end of an annular gas ejection pipe at a middle portion of the ball-piece unit, and a gas nozzle forming a fixed angle with a plane of an isolating cloth is provided on the gas ejection pipe.

10. The mobile-type power equipment maintenance device according to claim 9, wherein a working plate is provided on an upper portion of the supporting plate via a hydraulic rod, an elastic cover plate is provided at the annular orbit, the dust suction inlet, the opening motor, the closing motor and the offset motor by the working plate.

11. The mobile-type power equipment maintenance device according to claim 5, wherein an annular supporting ring is provided between a plurality of the ball-piece units, a dust suction inlet is annularly provided on the supporting plate and connected with a starting end of an annular gas ejection pipe at a middle portion of the ball-piece unit, and a gas nozzle forming a fixed angle with a plane of an isolating cloth is provided on the gas ejection pipe.

* * * * *